(12) United States Patent
Chino et al.

(10) Patent No.: US 6,402,168 B1
(45) Date of Patent: Jun. 11, 2002

(54) STEERING DEVICE FOR VEHICLE

(75) Inventors: Kenji Chino; Kenichi Katae; Yoshihisa Iwanaga, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/360,418

(22) Filed: Jul. 23, 1999

(30) Foreign Application Priority Data

Jul. 24, 1998 (JP) ............................................ 10-209576
Jul. 24, 1998 (JP) ............................................ 10-209577
Jul. 24, 1998 (JP) ............................................ 10-209578

(51) Int. Cl.[7] ............................. B62D 17/00; B60G 7/02
(52) U.S. Cl. ............................. 280/86.758; 280/86.757; 280/86.754
(58) Field of Search ....................... 280/86.758, 86.757, 280/86.754

(56) References Cited

U.S. PATENT DOCUMENTS

| 4,162,859 A | 7/1979 | McAfee | 403/75 |
| 6,047,789 A | * 4/2000 | Iwanga | 280/86.758 |

FOREIGN PATENT DOCUMENTS

| DE | 1 796 092 U | 7/1959 |
| EP | 0 827 893 A2 | 3/1998 |
| GB | 400101 | 10/1933 |
| JP | 304181 | 5/1997 |
| JP | 10-76977 | 3/1998 |

* cited by examiner

Primary Examiner—Brian L. Johnson
Assistant Examiner—Matt Luby
(74) Attorney, Agent, or Firm—Morgan & Finnegan, LLP

(57) ABSTRACT

A steering device for an industrial vehicle such as forklift. A pair of knuckle arms are rotatably supported at the ends of a rear axle. Each knuckle arm supports a rear wheel. A cylinder located in the rear axle includes an actuator rod. A pair of tie-rods couple the ends of the actuator rod to the knuckle arms. A toe angle adjusting mechanism is located between one end of the actuator rod and the corresponding tie-rod. The toe angle adjusting mechanism includes an adjuster pin having an eccentric shaft. The toe angle of the rear wheel that does not have the toe angle adjusting mechanism is adjusted by changing the neutral position of the actuator rod relative to the cylinder. Thereafter, the toe angle of the other rear wheel is adjusted by the toe angle adjusting mechanism, which facilitates adjustment of the toe angle of the wheels. The location and number of angle adjusting mechanisms are varied in alternate embodiments.

16 Claims, 12 Drawing Sheets

STEERING DEVICE FOR VEHICLE

BACKGROUND OF THE INVENTION

The present invention relates to a steering device used in industrial vehicles. More specifically, the present invention pertains to a steering device having a mechanism for adjusting toe angles.

A typical industrial vehicle such as forklift has a steering device for steering a pair of wheels in accordance with manipulation of a steering wheel. The correspondence between the orientation, or the toe angle, of each steered wheel and the position of the steering wheel must be accurately determined such that the vehicle travels in a straight line when the steering wheel is at the neutral position. However, the correspondence between the toe angles and the position of the steering wheel may be changed by errors produced when machining and assembling the parts of the steering device. The changed correspondence adversely affects the travel of the vehicle.

Japanese Unexamined Patent Publication No. 10-76977 discloses a steering device having a mechanism for adjusting toe angles. FIG. 16 shows such steering device 71. The steering device 71 is located in a vehicle axle 79. A pair of steered wheels 76 are located at the ends of the axle 79. Each wheel 76 is supported by a knuckle arm 74. Each knuckle arm 74 is pivotally supported on the associated end of the axle 79 by a kingpin 80. Each steered wheel 76, together with the associated knuckle arm 72, is pivoted about the axis of the kingpin 80.

The device 71 has a cylinder 73 having an actuator rod 72. The ends of the actuator rod 72 each extend toward one of the steered wheels 76. Each knuckle arm 74 is coupled to the corresponding end of the actuator rod 72 by a tie-rod 75. Each tie-rod 75 and the associated knuckle arm 74 are pivotally coupled to each other by a substantially cylindrical shaft 77. The tie-rod 75 is pivotally connected to the associated end of the actuator rod 72 by an adjuster pin 78. Axial movement of the actuator rod 72 is converted into pivoting movement of the knuckle arms 74 about the kingpins 80 by the tie-rods 75.

Although not illustrated, each adjuster pin 78 includes a support portion and an eccentric portion. The support portion is rotatably supported by the actuator rod 72 and the eccentric portion is radially offset from the axis of the support portion. The tie-rod 75 is connected to the eccentric portion to pivot about the eccentric portion. The adjuster pin 78 also has a hexagonal head the center of which is aligned with the axis of the support portion. Brackets 81 are secured to the ends of the actuator rod 72 by bolts 82. Each bracket 81 has a hexagonal hole 81a, which corresponds to the hexagonal head of the adjuster pin 78. The hexagonal head is fitted in the hexagonal hole 81a so that the pin 78 does not rotate relative to the actuator rod 72.

Rotating one of the adjuster pins 78, with the corresponding bracket 81 removed, moves the axis of the eccentric portion about the axis of the support portion. Specifically, since the adjuster pin 78 is rotated about the axis of the support portion relative to the actuator rod 72, the axis of the eccentric portion is moved along a circle, the radius of which is the distance between the axis of the support portion and the axis of the eccentric portion. Such movement of the axis of the eccentric portion moves the tie-rod 75. This moves the knuckle arm 74 thereby changing the toe angle of the corresponding steered wheel 76. The bracket 81 is installed after rotating the adjuster pin 78 by a desired angle. The bracket 81 prevents the adjuster pin 78 from rotating relative to the actuator rod 72, thereby determining the correspondence between the toe angle and the position of the steering wheel. In this manner, the orientation, or the toe angle, of the steered wheel 86 is adjusted.

In the device 71, the toe angle of each wheel 76 is adjusted by the corresponding adjuster pin 78, which is located at the corresponding end of the actuator rod 72. In order to adjust the toe angles of the steered wheels 76, the pins 78 must be independently rotated, which complicates the adjustment of the toe angles and extends the time needed for the adjustment.

As shown in FIG. 16, the joints of the actuator rod 72 and the tie-rods 75, or the parts including the pins 78, are covered by the axle 79. Thus, adjusting the toe angles is difficult because the axle 79 gets in the way.

SUMMARY OF THE INVENTION

Accordingly, it is an objective of the present invention to provide a steering device that allows toe angles to be easily adjusted.

To achieve the foregoing and other objectives and in accordance with the purpose of the present invention, a steering device for steering a pair of wheels about steering axes is provided. The wheels are located at left and right sides of a vehicle, respectively. The device includes left and right knuckle arms for supporting the wheels, respectively, an actuator rod, left and right tie-rods, left and right actuator joints and a toe angle adjusting mechanism. The knuckle arms are supported by the vehicle such that each knuckle arm rotates about the steering axis of the corresponding wheel. The actuator rod reciprocates in the lateral direction of the vehicle and has left and right ends, each end extending toward the corresponding knuckle arm. Each tie-rod connects the corresponding end of the actuator rod to the corresponding knuckle arm. The tie-rods convert reciprocation of the actuator rod into rotation of the knuckle arms. Each actuator joint is located between the corresponding end of the actuator rod and the corresponding tie-rod. The toe angle adjusting mechanism is located at only one of the left and right actuator joints to adjust the toe angle of the corresponding wheel.

The present invention may also be embodied as another steering device for steering a pair of wheels about steering axes. The device includes left and right knuckle arms, an actuator rod, left and right tie-rods, left and right steering joints and a toe angle adjusting mechanism. Each steering joint is located between the corresponding tie-rod and the corresponding knuckle arm. The toe angle adjusting mechanism is located at at least one of the steering joints to adjust the toe angle of the wheel.

The present invention may be embodied in yet another steering device for steering a pair of wheels about steering axes. The device includes left and right knuckle arms, an actuator rod, left and right tie-rods, and a variable pivot joint. The variable pivot joint is located in the steering device and pivotally joins a first member and a second member. The first member is one of the tie-rods and the second member is the actuator rod or a corresponding one of the knuckle arms. The variable pivot joint includes an adjuster pin, a retainer and a fastener. The adjuster pin has a support shaft, an eccentric shaft and an engagement portion. The axis of the support shaft is parallel to and spaced from the axis of the eccentric shaft. One of the first and second members pivots about the axis of the support shaft and the other member pivots about the axis of the eccentric shaft. The adjuster pin is rotated to vary the position of the first member with respect to the second member to adjust the characteristics of the steering device. The retainer engages the engagement portion of the adjuster pin and for locking the adjuster pin with respect to one of the members of the variable pivot joint. The retainer engages the adjuster pin at any one of a plurality of angular engagement positions. Each angular engagement position is spaced from an adjacent angular engagement position by a first angle. The fastener fastens the retainer to one of the members of the variable pivot joint at one of at least two fastening positions, which are separated from one another by a second angle. The second angle is different from the first angle.

Further, the present invention may be embodied as a method of adjusting the toe angles of a pair of steered wheels of a vehicle. The method includes setting the toe angle of a first one of the wheels by axially moving an actuator rod. Axial movement of the actuator rod steers both wheels. The method also includes setting the toe angle of a second one of the wheels by adjusting a variable joint between a tie-rod, which is used for steering the second wheel, and either the actuator rod or a knuckle arm. The knuckle arm is pivoted by the tie-rod. The variable joint has a movable axis. The toe angle of the second wheel is set by moving the movable axis without moving the actuator rod.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

A first embodiment of the present invention will now be described with reference to FIGS. 1 to 5.

Figure 2:
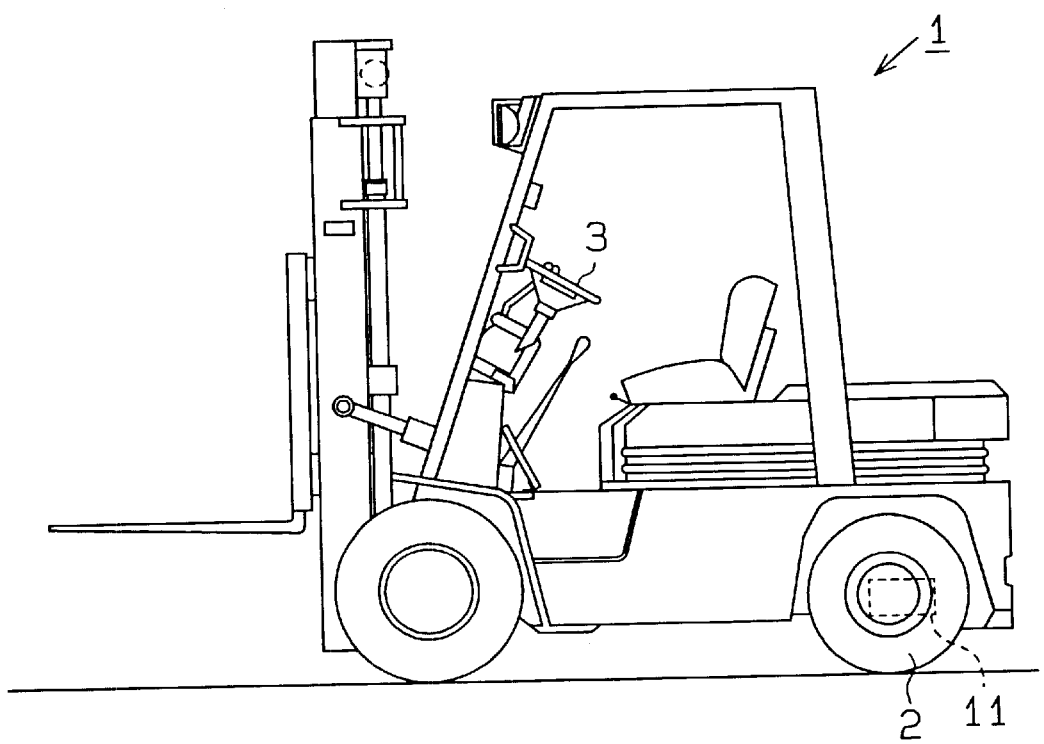
FIG. 2 is a side view showing a forklift having the steering device of FIG. 1.

As shown in FIG. 2, an industrial vehicle, or forklift 1, has a pair of steered wheels, or rear wheels 2 (FIG. 2 only shows the left rear wheel 2). A steering device 11 steers the rear wheels 2 based on manipulation of a steering wheel 3.

Figure 1:
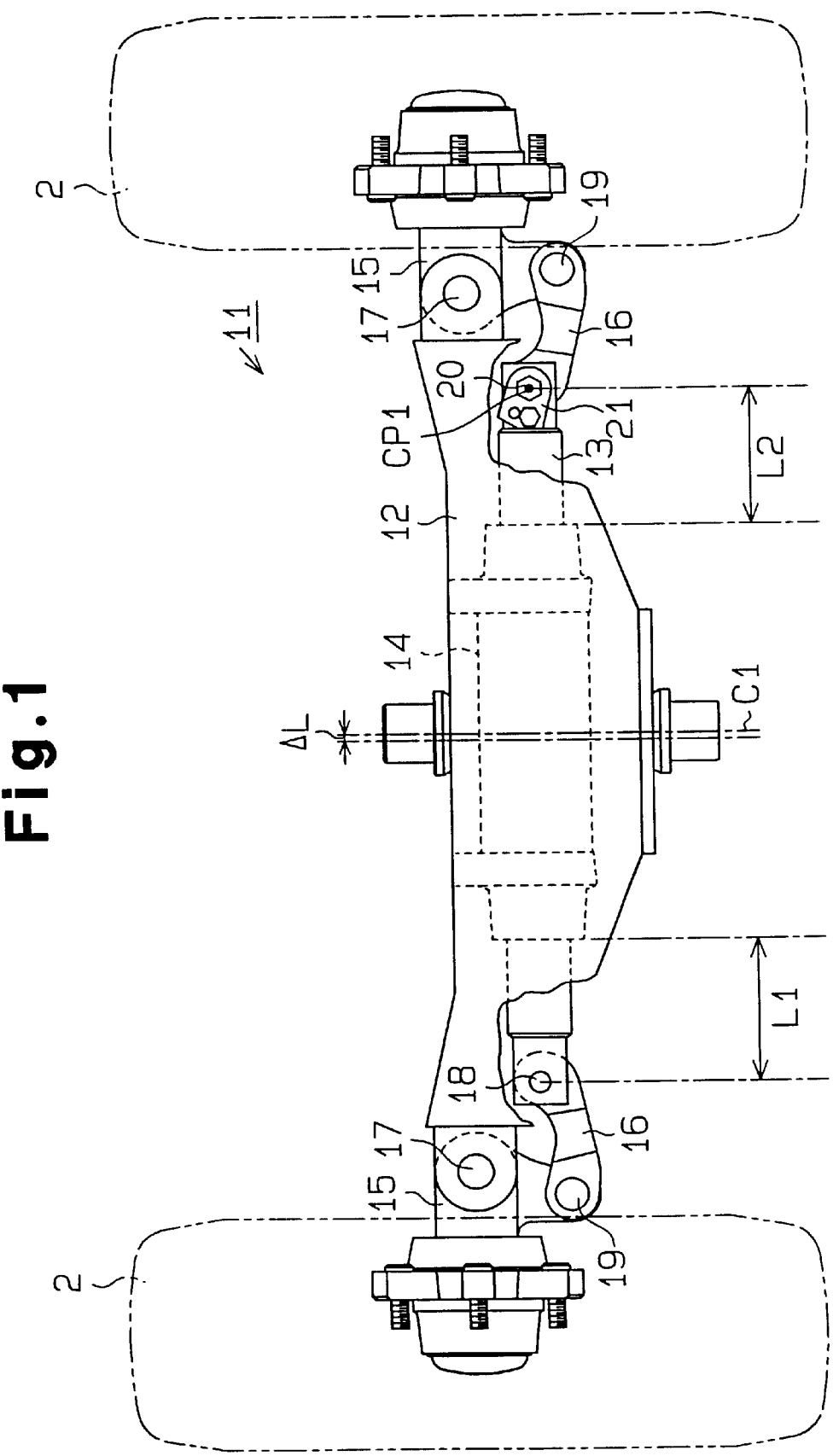
FIG. 1 is a plan view illustrating a steering device according to a first embodiment of the present invention.

As shown in FIG. 1, the steering device 11 includes a cylinder 14 located in a rear axle 12. Each rear wheel 2 is supported by a knuckle arm 15. Each knuckle arm 15 is rotatably supported by a kingpin 17 at one end of the axle 12. Each rear wheel 2 and the corresponding knuckle arm 15 are integrally steered about the corresponding kingpin 17.

The cylinder 14 includes an actuator rod 13. The ends of the actuator rod 13 extend to the rear wheels 2. The knuckle arms 15 are coupled to the ends of the actuator rod 13 by tie-rods 16. The tie-rods 16 convert axial movement of the actuator rod 13 into pivoting of the knuckle arm 15 about the kingpins 17. In other words, as the actuator rod 13 is moved in the axial direction, the rear wheels 2 are pivoted about the kingpins 13. If the actuator rod 13 is moved to the right as viewed in FIG. 1, the rear wheels 2 are rotated counter-clockwise. If the actuator rod 13 is moved to the left, the rear wheels 2 are rotated clockwise.

The left tie-rod 16 is rotatably coupled to the actuator rod 13 by a cylindrical support shaft 18 and is rotatably coupled to the left knuckle arm 15 by a cylindrical support shaft 19. The right tie-rod 16 is also rotatably coupled to the right knuckle arm 15 by a cylindrical support shaft 19. However, the tie-rod 16 is rotatably coupled to the actuator rod 13 by an adjuster pin 20 having an eccentric shaft.

Figure 3:
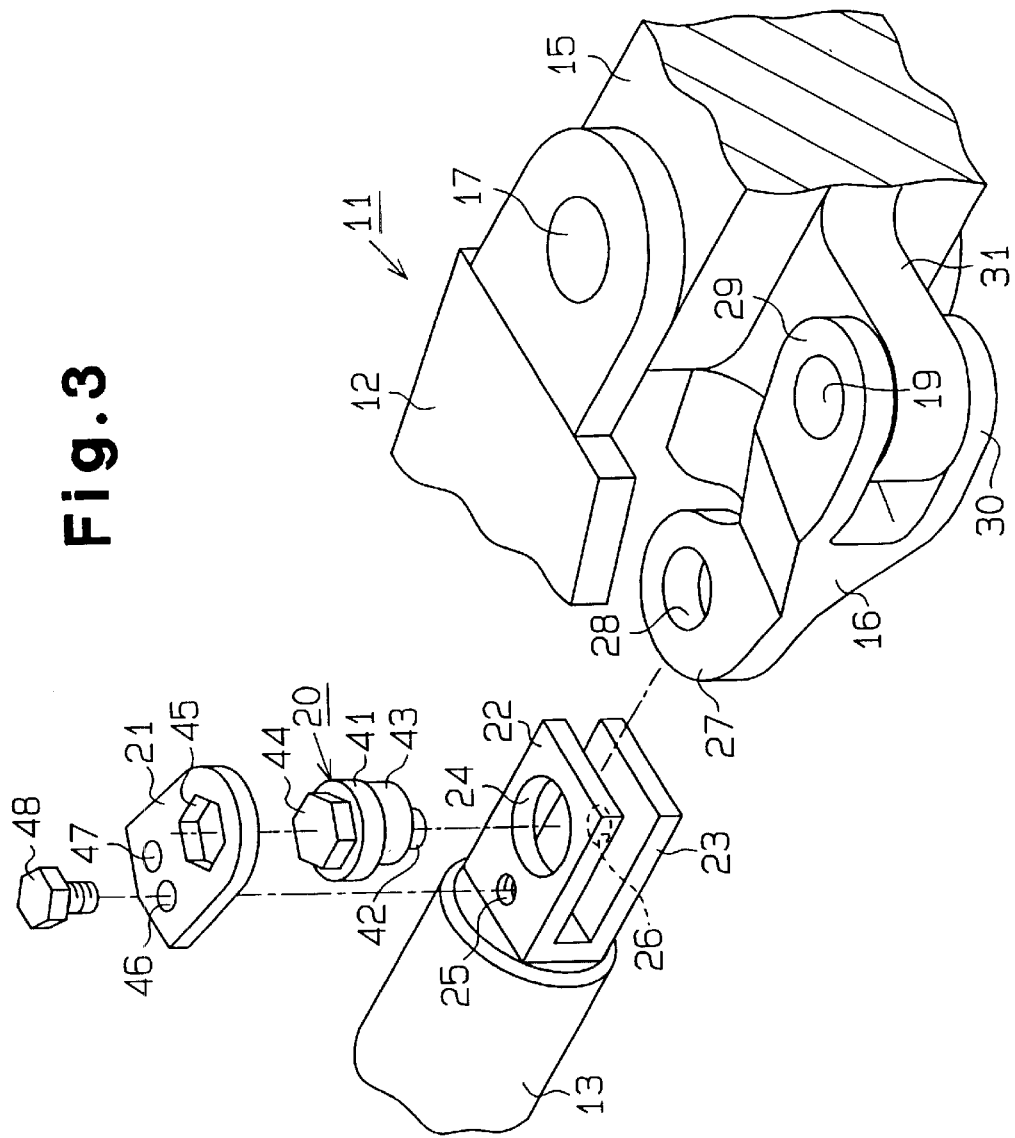
FIG. 3 is an exploded perspective view illustrating part of the steering device of FIG. 1.

FIG. 3 is a perspective view illustrating the coupling structure of the right tie-rod 16 and the actuator rod 13. Upper and lower clevis arms 22, 23 are formed at the right end of the actuator rod 13. A through hole 24 and a threaded hole 25 are formed in the upper clevis arm 22. A through hole 26 is formed in the lower clevis arm 23. The axis of the through hole 26 is aligned with the axis of the through hole 24 in the upper leaf 22. The diameter of the through hole 26 is smaller than the diameter of the through hole 24.

The right tie-rod 16 includes a coupling tongue 27. A through hole 28 is formed in the tongue 27. The tie-rod 16 has upper and lower clevis arms 29, 30. The right knuckle arm 15 includes a tongue 31 extending perpendicular to the axis of the knuckle arm 15. The tongue 31 is located between the clevis arms 29, 30. The right support shaft 19 rotatably couples the tongue 31 to the clevis arms 29, 30. The coupling structure between the left tie-rod 16 and the left knuckle arm 15 is substantially the same as the structure shown in FIG. 3.

The tongue 27 of the right tie-rod 16 is located between the clevis arms 22, 23. Then, the adjuster pin 20 is inserted from above into the through holes 24, 26 and the through hole 28, which rotatably couples the right tie-rod 16 to the actuator rod 13.

Figure 4A:
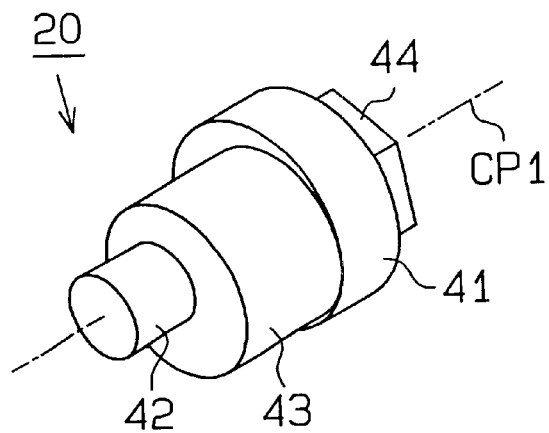
FIG. 4(a) is a perspective view showing the adjuster pin of FIG. 3.
Figure 4B:
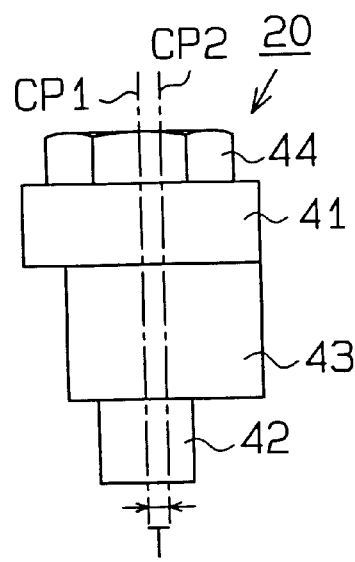
FIG. 4(b) is a side view showing the adjuster pin of FIG. 4(a)

As shown in FIGS. 3, 4(a) and 4(b), the adjuster pin 20 includes coaxial cylindrical support shafts 41, 42 and a cylindrical eccentric shaft 43 located between the support shafts 41 and 42. The axis CP2 of the eccentric shaft 43 is radially offset from the axis CP1 of the support shafts 41, 42 by a predetermined distance T. A polygonal head is formed on the top of the upper support shaft 41. In this embodiment, the polygonal head is a hexagonal head 44. The diameter of the upper shaft 41 is greater than the diameter of the eccentric shaft 43. The diameter of the eccentric shaft 43 is greater than that of the lower shaft 42.

When the tie-rod 16 is coupled to the actuator rod 13 by the adjuster pin 20, the upper shaft 41 is fitted in the through hole 24 of the upper clevis arm 22 and the lower shaft 42 is fitted in the through hole 26 of the lower clevis arm 23. The eccentric shaft 43 is fitted in the through hole 28 of the tongue 27. In other words, the shafts 41, 42 are rotatably supported by the actuator rod 13, and the tie-rod 16 is pivotally connected to the eccentric shaft 43 about the eccentric axis CP2.

Figure 5:
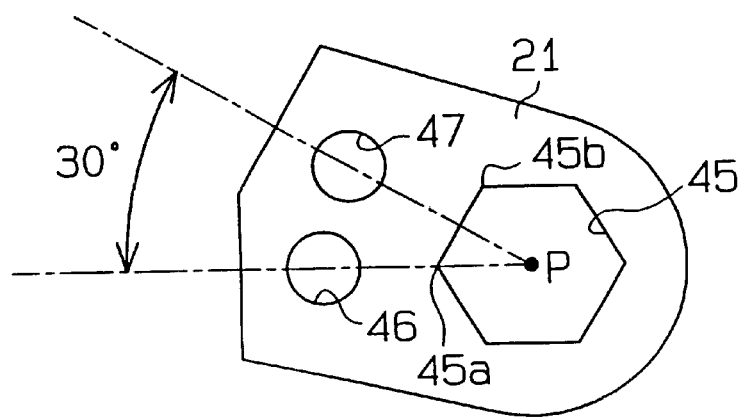
FIG. 5 is a plan view showing the bracket.

As shown in FIGS. 1 and 3, a retainer, or bracket 21 is fixed to the upper clevis arm 22 by a fastener, or preferably, by a bolt 48. As illustrated in FIG. 5, the bracket 21 has a polygonal engaging hole. In this embodiment, the polygonal engaging hole is a hexagonal hole 45, which corresponds to the hexagonal head 44 of the adjuster pin 20. The bracket 21 also has a pair of bolt holes 46, 47. The bolt holes 46, 47 are located on a common imaginary arc the center of which is the axis P of the hexagonal hole 45. The bolts holes 46, 47 are angularly spaced by thirty degrees. The bolt hole 46 is preferably located on a line including the center P of the hexagonal hole 45 and a corner 45a. The other bolt hole 47 is located on a line passing through the center P and the mid-point of a side between the corner 45a and an adjacent corner 45b. This arrangement allows the positions of the bolt holes 46, 47 to be easily determined, which facilitates the manufacture of the bracket 21.

As shown in FIGS. 1 and 3, the hexagonal hole 45 of the bracket 21 is fitted to the head 44 of the adjuster pin 20 after the right tie-rod 16 is coupled to the actuator rod 13 by the adjuster pin 20. Then, the bolt 48 is inserted into either the bolt hole 46 or the bolt hole 47 and is threaded into the threaded hole 25 of the actuator rod 13. As a result, the bracket 21 is fixed to the actuator rod 13 and the adjuster pin 20 is prevented from rotating relative to the actuator rod 13.

If the adjuster pin 20 is rotated with the bracket 21 removed, the axis CP2 of the eccentric shaft 43 is moved about the axis CP1 of the support shafts 41, 42. Specifically, the adjuster pin 20 is rotated about the axis CP1 of the support shafts 41, 42 relative to the actuator rod 13. Therefore, the axis CP2 of the eccentric shaft 43 is moved on an arc, the radius T of which is the distance between the axis CP2 and the axis CP1. This pivots the right knuckle arm 15 via the right tie-rod 16. As a result, the orientation of the right rear wheel 2, or the toe angle, is changed. The bracket 21 is attached after rotating the adjuster pin 20 by a desired angle, which prevents the adjuster pin 20 from rotating relative to the actuator rod 13 and determines the correspondence between the toe angle of the right rear wheel 2 and the position of the steering wheel 3.

The toe angles of the steered wheels are adjusted during the initial assembly of the forklift 1 and periodically during the life of the vehicle. The toe angles of the rear wheels 2 of the device of FIG. 1 are adjusted in the following manner. First, the hydraulic cylinder 14 is disconnected from its hydraulic circuit (not shown) so that the steering wheel 3 does not respond to movement of the actuator rod 13. As shown in FIG. 1, the position of the actuator rod 13 is changed for adjusting the toe angle of the left rear wheel 2. The actuator rod 13 is axially moved to the left or to the right as viewed in FIG. 1 for moving to a position corresponding to the desired toe angle of the left rear wheel 2. When the angle of the left rear wheel 2 matches the desired toe angle, the position of the actuator rod 13 is set as a neutral position.

For example, when the actuator rod 13 is located at a center position C1 as shown in FIG. 1, the length L1 of the actuator rod 13 protruding from the left end of the cylinder 14 to the axis of the shaft 18 is equal to the length L2 of the actuator rod 13 protruding from the right end of the cylinder 14 to the axis CP1 of the adjuster pin 20. However, if the actuator rod 13 must be moved to the left by a distance ΔL to obtain the desired toe angle of the left rear wheel 2, the protruding length L1 of the actuator rod 13 to the left is longer than the protruding length L2 of the rod to the right by the distance ΔL after the actuator rod 13 is moved to the neutral position.

Then, the hydraulic circuit is connected to the cylinder 14t make the cylinder 14 operational. Thereafter, the toe angle of the right rear wheel 2 is adjusted by rotating the adjuster pin 20 with the bracket 21 removed. The bracket 21 is replaced after the adjuster pin 20 is adjusted. Thus, the bracket 21 fixes the relationship between the toe angle of the right rear wheel 2 and the steering wheel 3. In this manner, the toe angles of the left and right rear wheels 2 are adjusted.

The embodiment of FIGS. 1–5 has the following advantages.

The adjuster pin 20, which has the eccentric shaft 43, couples one end of the actuator rod 13 with the corresponding tie-rod 16. In other words, the toe angle adjusting mechanism is mounted between one end of the actuator rod 13 and the corresponding tie-rod 16. Therefore, only one pin 20 is required to adjust the toe angles of both rear wheels 2, which facilitates adjustment of the toe angles. Further, only one toe adjusting mechanism is required, which simplifies the structure of the steering device 11.

The toe angles of the rear wheels 2 are adjusted by setting a neutral position for the actuator rod 13 and rotating the adjuster pin 20. In other words, the toe angles can be easily adjusted without disengaging the tie-rod 16 from the actuator rod 13.

The hexagonal hole 45 of the bracket 21 is engaged with the hexagonal head 44 of the adjuster pin 20, which prevents the adjuster pin 20 from rotating relative to the actuator rod 13. Thus, the determined toe angles are maintained. Since the adjuster pin 20 has the hexagonal head 44, the adjuster pin 20 can be rotated with a conventional wrench and no specially designed tools are required, which simplifies adjustment of the toe angle.

The adjuster pin 20 has the hexagonal head 44, and the bracket 21 has a hexagonal hole 45 engaged with the head 44. This allows the adjuster pin 20 to be fixed with respect to the bracket 21 at one of six positions, which are angularly spaced apart by sixty degrees. The bracket 21 has the two bolt holes 46, 47, which are located on the same circle centered on the axis P and are angularly spaced apart by thirty degrees. When the bolt 48 is inserted into the bolt hole 46, the angle of the bracket 21 relative to the actuator rod 13 is different by thirty degrees from when the bolt 48 is inserted in the other bolt hole 47. Therefore, the adjuster pin 20 can be located at one of twelve angular positions relative to the actuator rod 13. Thus, the toe angle of the right rear wheel 2 can be finely adjusted by selecting one of the twelve positions. The position of the adjuster pin 20 is adjusted among the twelve positions, which are angularly spaced apart by equal thirty degree increments. Therefore, the toe angle is easily adjusted.

If the bracket 21 had only one of the holes 46, 47, the adjuster pin 20 could be rotated to one of only six positions, which results in a more coarse adjustment. However, if the head 44 and the hole 45 have polygonal shapes with more sides than a hexagon, for example, if the head 44 and the hexagonal hole 45 have twelve sides, the toe angle can be selected from twelve positions. However, a greater number of polygonal sides on the head 44 and the hexagonal hole 45 makes it difficult for the bracket 21 to resist rotational torque of the adjuster pin 20, which may result in undesired rotation of the adjuster pin 20. The head 44 and the hole 45 are hexagonal in the embodiment of FIGS. 1 to 5. Therefore, the bracket 21 positively resists torque from the adjuster pin 20, which guarantees that the adjuster pin 20 cannot rotate.

The toe angle adjusting mechanism, which includes the adjuster pin 20, may be located between the left end of the actuator rod 13 and the left tie-rod 16, and the shaft 18 may be located between the right end of the actuator rod 13 and the right tie-rod 16.

In FIG. 3, the tongue 27 of the tie-rod 16 is located between the clevis arms 22, 23 formed at the end of the actuator rod 13. However, in a reversal of parts, clevis arms may be formed on the tie-rod 16, and the end of the actuator rod 13 may be located between the clevis arms. In this case, the support shafts 41, 42 of the adjuster pin 20 are fitted to the tie-rod 16, and the eccentric shaft 43 of the adjuster pin 20 is fitted in the actuator rod 13. This construction brings about the same results and advantages as the construction of FIG. 3.

A second embodiment of the present invention will now be described with reference to FIGS. 6 to 8. The differences from the embodiment of FIGS. 1–5 will mainly be discussed below, and like or the same reference numerals are given to those components that are like or the same as the corresponding components of the embodiment of FIGS. 1 to 5.

Figure 6:
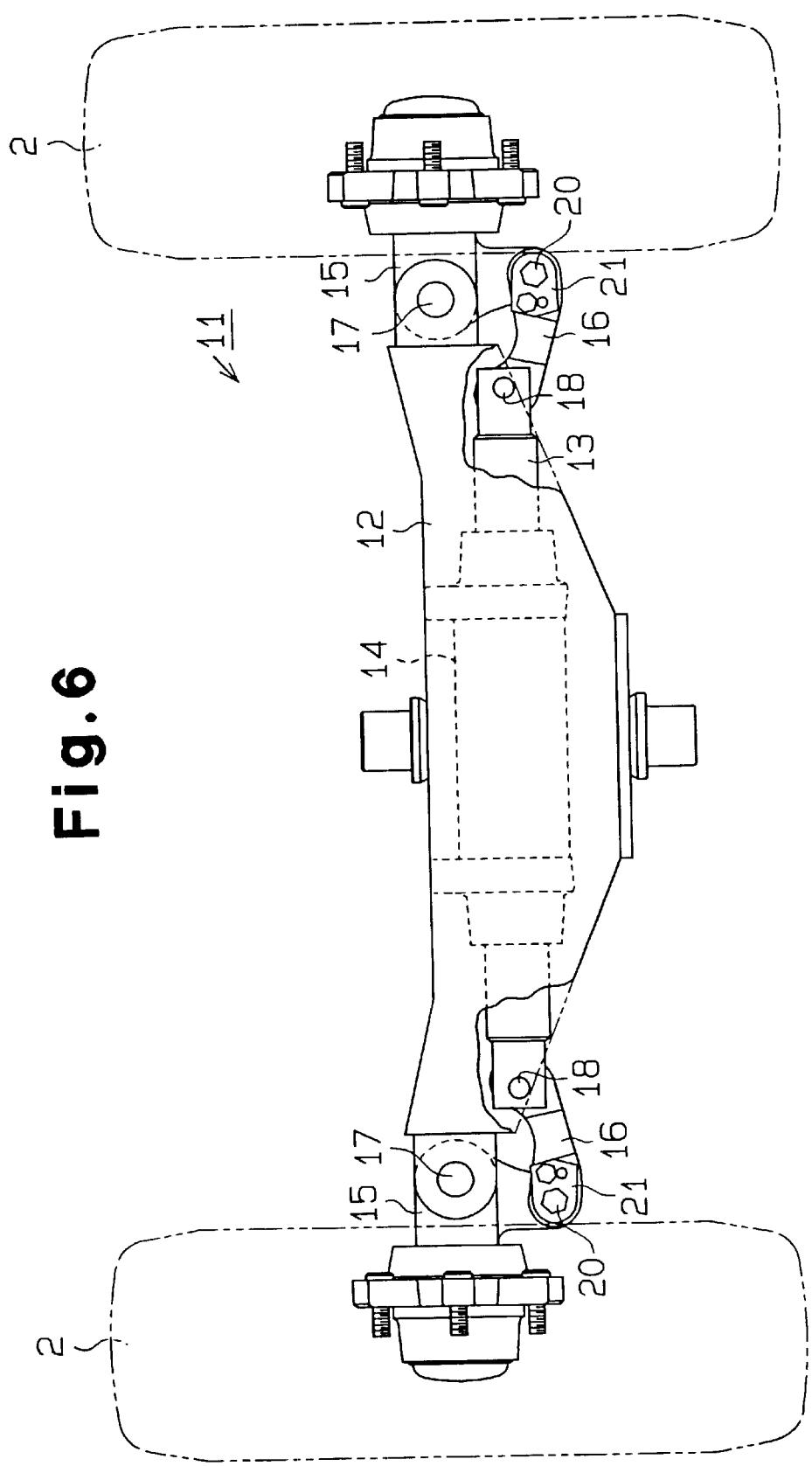
FIG. 6 is a plan view illustrating a steering device according to a second embodiment of the present invention.

As shown in FIG. 6, two toe angle adjusting mechanisms, each including the adjuster pin 20 and the bracket 21, are located between the tie-rods 16 and the knuckle arms 15. Each end of the actuator rod 13 is coupled to the corresponding tie-rods 16 by a cylindrical support shaft 18.

Figure 7:
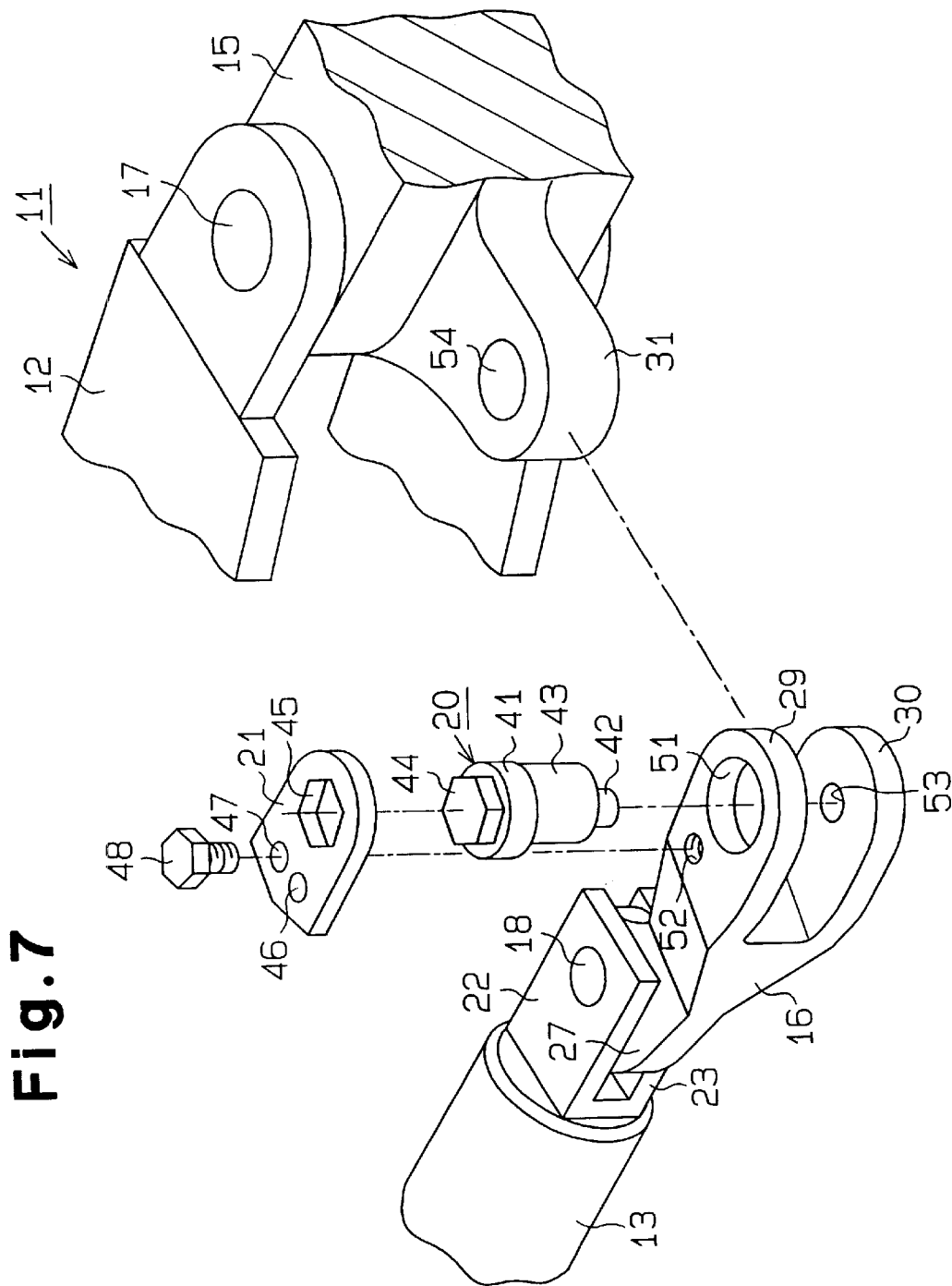
FIG. 7 is an exploded perspective view illustrating part of the steering device of FIG. 6.

FIG. 7 is a perspective view showing the toe angle adjusting mechanism between the right tie-rod 16 and the right knuckle arm 16. The left mechanism between the left tie-rod 16 and the left knuckle arm 15 has the same structure as the right mechanism of FIG. 7. As shown in FIG. 7, an upper through hole 51 and a threaded hole 52 are formed in the upper clevis arm 29 of the right tie-rod 16. A lower through hole 53 is formed in the lower clevis arm 30 of the right tie-rod 16. The diameter of the lower through hole 53 is smaller than that of the upper through hole 51. The upper through hole 51 is axially aligned with the lower through hole 53.

A through hole 54 is formed in the tongue 31 of the knuckle arm 15. The tongue 31 is located between the clevis arms 29, 30. The adjuster pin 20 is inserted from above into the through holes 51, 53 and the through hole 54 of the tongue 31. As a result, the right tie-rod 16 is rotatably coupled to the right knuckle arm 15. Support shafts 41, 42 of the adjuster pin 20 are rotatably supported by the right tie-rod 16, and the right knuckle arm 15 is rotatably coupled to the eccentric shaft 43 of the adjuster pin 20. The bracket 21 is secured to the upper clevis arm 29 by the bolt 48, and the hexagonal hole 45 of the bracket 21 is fitted to the head 44 of the adjuster pin 20.

In the embodiment of FIG. 7, each tie-rod 16 and the corresponding knuckle arm 15 are connected each other by a connector pin 20. As described in the embodiment of FIGS. 1 to 5, rotating the adjuster pin 20 with the bracket 21 removed permits the toe angle of the corresponding rear wheel 2 to be adjusted. For example, the right adjuster pin 20 is rotated to change the position of the axis CP2 of the eccentric shaft 43 relative to the right tie-rod 16 in FIG. 8. This rotates the right knuckle arm 15, which is coupled to the eccentric shaft 43, from the position shown by dotted lines to the position shown by solid lines.

To permit unobstructed access to the adjuster pins 20, the adjuster pins 20 are not covered by the rear axle 12. In other words, the joints between the tie-rods 16 and the knuckle arms 15 are exposed. Therefore, when adjusting the toe angles, parts of the vehicle such as the axle 12 do not interfere. This facilitates the adjustment of the toe angle.

In FIG. 7, the tongue 31 of the knuckle arm 15 is located between the clevis arms 29, 30 formed on the tie-rod 16. However, in a reversal of parts, the clevis arms may be formed on the knuckle arm 15, and the tie-rod 16 may be located between the clevis arms. In this case, the support shafts 41, 42 of the pin 20 are fitted to the knuckle arm 15, and the eccentric shaft 43 of the adjuster pin 20 is fitted in the tie-rod 16. This construction brings about the same results and advantages as the construction of FIG. 7.

Alternatively, one toe angle adjusting mechanism may be provided only between the tie-rod 16 and the knuckle arm 15 at one end of the axle 12. The toe angle of the rear wheel 2 without the toe angle adjusting mechanism may be adjusted by changing the axial position of the actuator rod 13 as described in the adjusting procedure of the embodiment of FIGS. 1 to 5. This simplifies the construction of the steering device 11 compared to the embodiment of FIGS. 6 to 9.

Further, one toe angle adjusting mechanism may be located between the actuator rod 13 and the tie-rod 16 of one of the rear wheels 2 as in the embodiment of FIGS. 1 to 5, and another mechanism may be located between the tie-rod 16 and the knuckle arm 15 of at least one of the rear wheels 2. This structure allows the toe angles to be selected from a wide range of angular positions. In other words, the toe angles may be finely adjusted.

Figure 8:
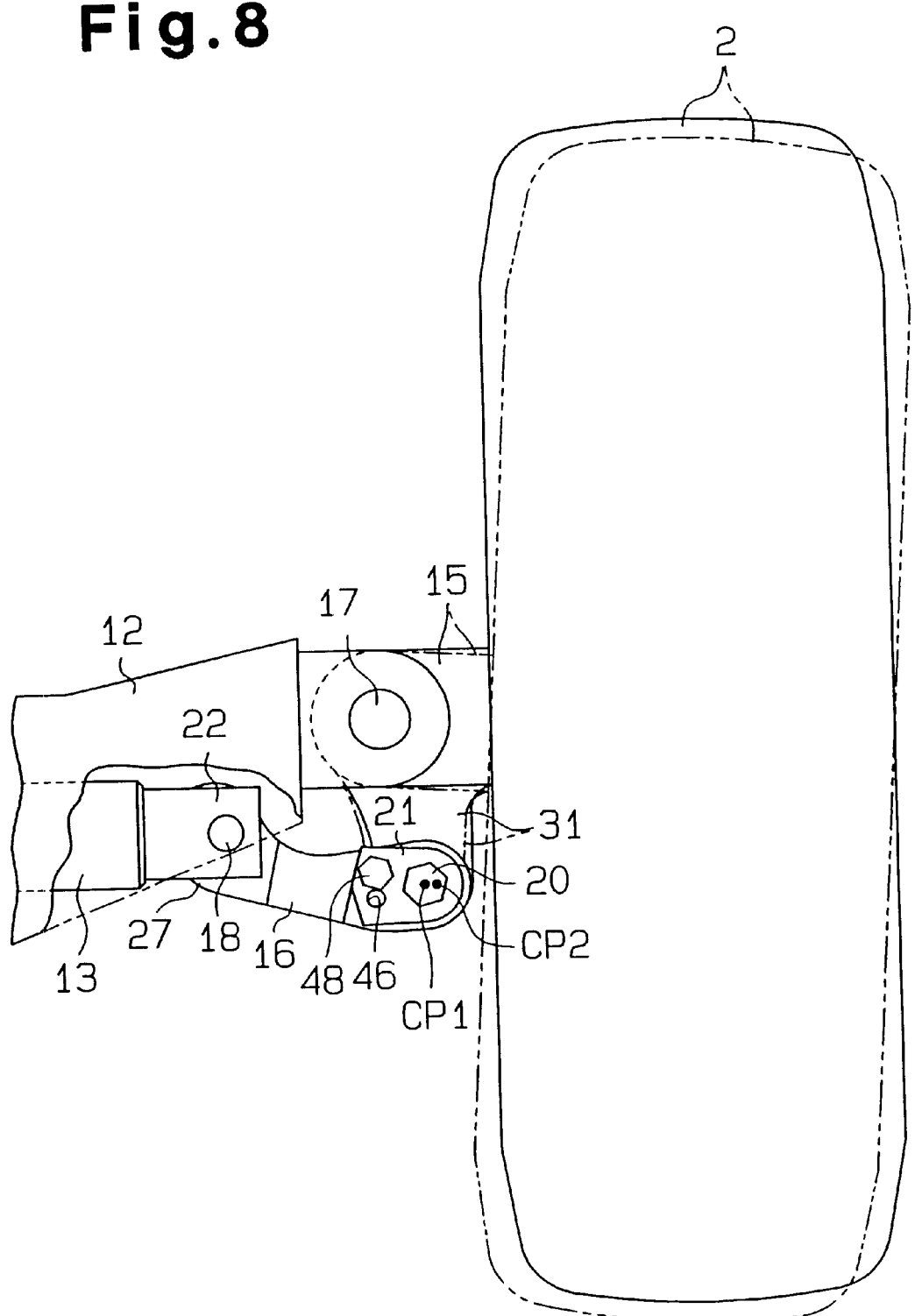
FIG. 8 is a partial plan view showing adjustment of a toe angle by the steering device of FIG. 6.
Figure 9:
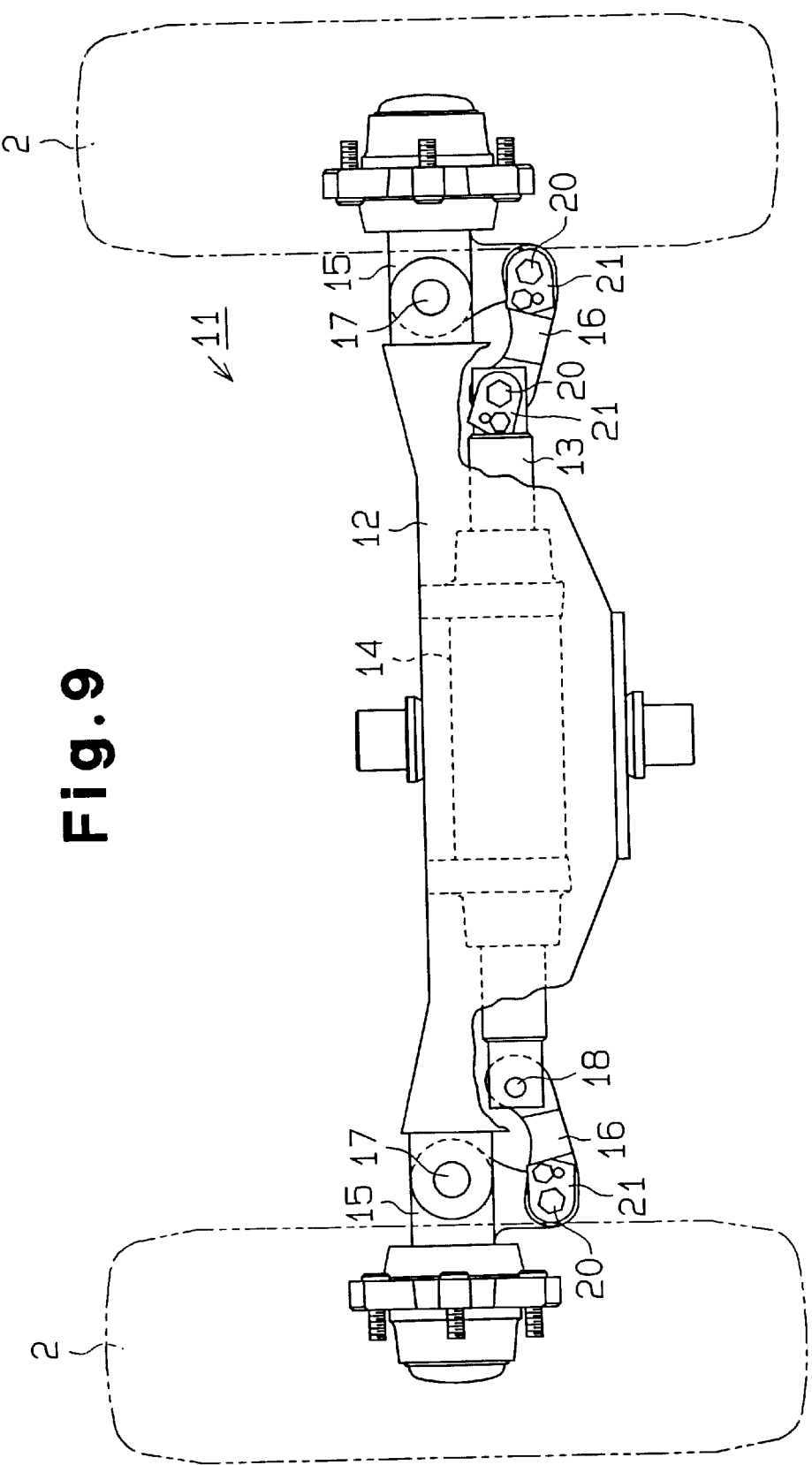
FIG. 9 is a plan view illustrating a steering device according to a third embodiment of the present invention.
Figure 10:
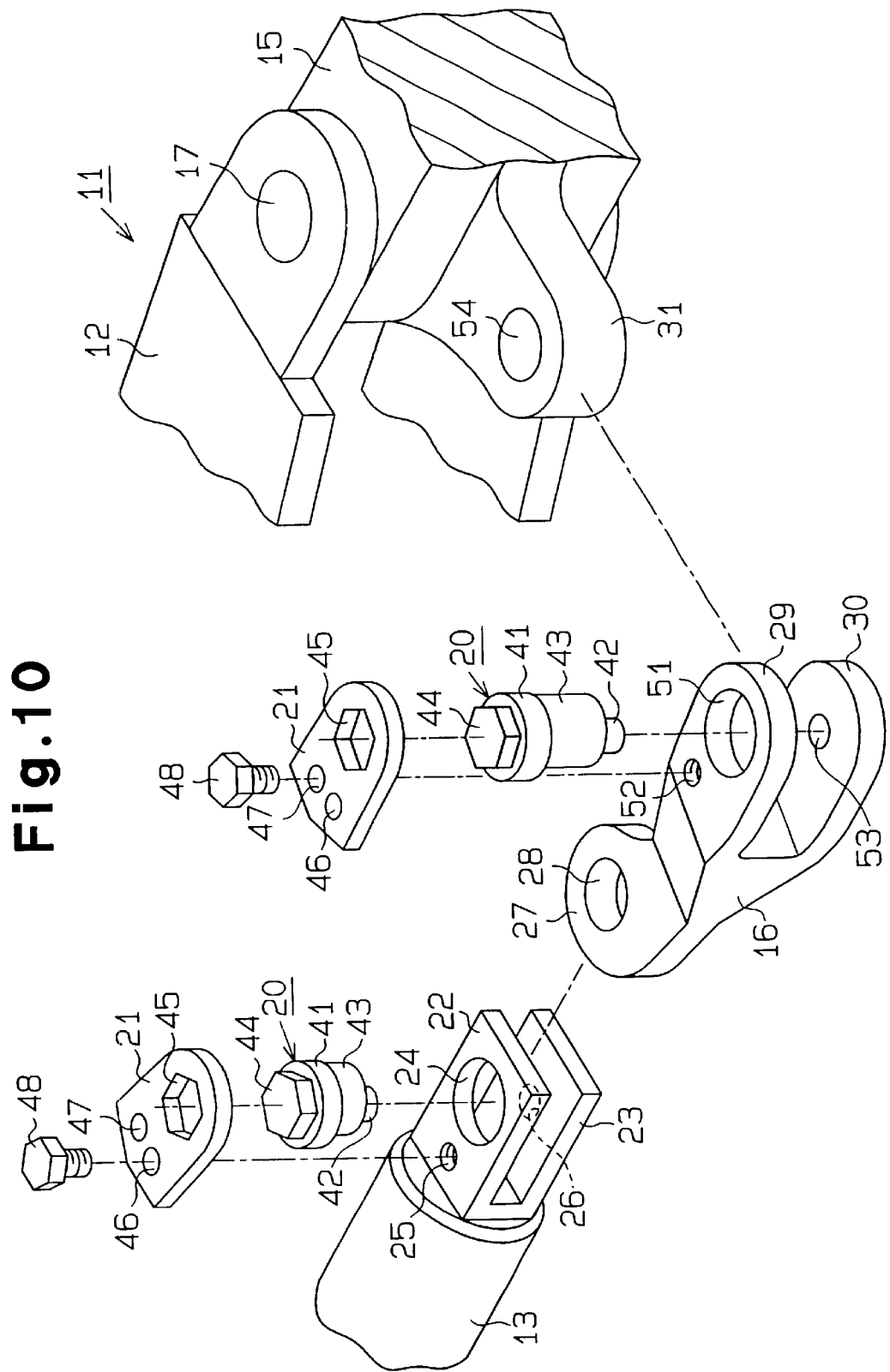
FIG. 10 is an exploded perspective view illustrating part of the steering device of FIG. 9.

FIGS. 9 and 10 show another embodiment, which is a combination of the embodiment of FIGS. 1 to 5 and the embodiment of FIGS. 6 to 8. That is, toe angle adjusting mechanisms are located between the actuator rod 13 and the tie-rod 16 of one of the rear wheels 2 and between each tie-rod 16 and the corresponding knuckle arm 15.

Figure 11:
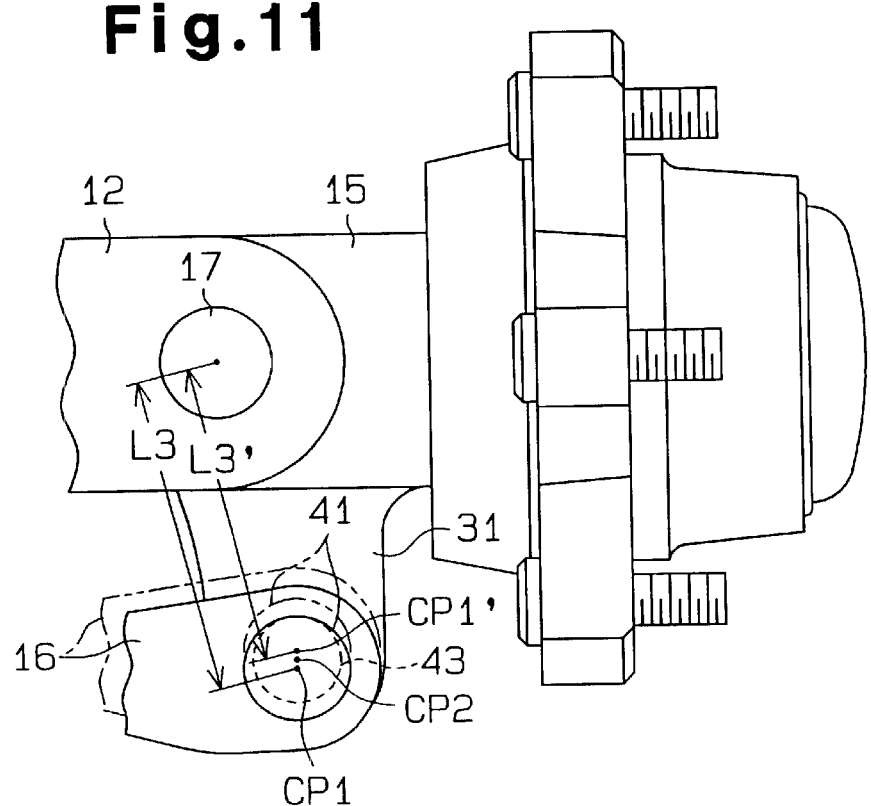
FIG. 11 is a partial plan view showing adjustment of a maximum steered wheel by the steering device of FIG. 9.

In the embodiment of FIGS. 9 and 10, the adjuster pins 20 located between the tie-rods 16 and the knuckle arms 15 are not used for adjusting the toe angles but for adjusting the maximum steered angle of the rear wheels 2. That is, as shown in FIG. 11, the distance between the axis CP1 of the support shafts 41, 42 of the adjuster pin 20 and the axis of the kingpin 17 is changed by rotating the adjuster pin 20 with the corresponding brackets 21 removed. In FIG. 11, the axis CP1 of the support shafts 41, 42 is moved to a position CP1' by rotating the adjuster pin 20. As a result, the distance between the axis CP1 and the axis of the kingpin 17 is changed from L3 to L3'. This changes the ratio of the rotation amount of the knuckle arm 15 to the motion amount of the actuator rod 13, which alters the maximum steered angle of the rear wheels 2.

Errors produced when machining and assembling the parts of the steering device 11 produce not only errors in the toe angles of the rear wheels 2, but also errors in the maximum steered angle of the rear wheels 2. Errors in the maximum steered angle can cause the rear wheels 2 to interfere with the body frame. The steering device 11 of FIG. 11, which can adjust the maximum steered angle, is therefore useful.

The joints between the tie-rods 16 and the knuckle arms 15 are not covered by the axle 12 but are exposed. Therefore, when adjusting the maximum steered angle, parts of the vehicle such as the axle 12 do not interfere, which facilitates the procedure.

As described with reference to FIG. 8, the toe angles of the rear wheels 2 can be changed when rotating the adjuster pin 20 for adjusting the maximum steered angle. It is therefore preferable to adjust the maximum steered angle by rotating the pins 20 located between the tie-rods 16 and the knuckle arms 15 prior to adjusting the toe angles. The toe angles are then adjusted by first changing the axial position of the actuator rod 13 to set the toe angle of one wheel. Then, the adjuster pin 20 between the right end of the actuator rod 13 and the right tie-rod 16 is adjusted to set the other toe angle.

Figure 12:
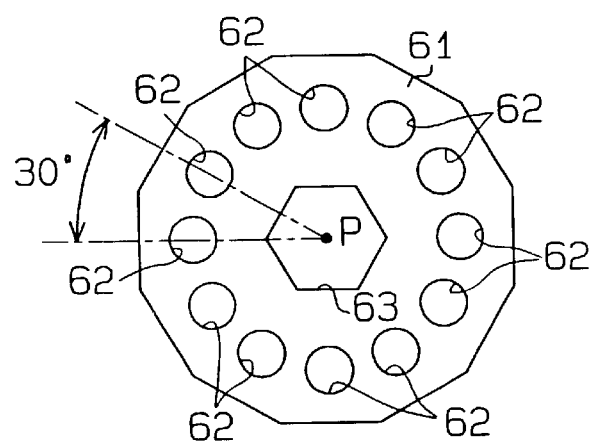
FIG. 12 is a plan view illustrating a bracket according to a fourth embodiment of the present invention.

FIG. 12 shows a bracket 61 according to a fourth embodiment of the present invention. The bracket 61 has a hexagonal hole 63, which is fitted to the head 44 of the pin 20. The bracket 61 also has bolt holes, the number of which is twelve in FIG. 12, about the hexagonal hole 63. The bolt holes 62 are located on the same imaginary circle, the center of which is the center P of the hole 63, and equally spaced apart by thirty degrees. Each bolt hole 62 is formed either on a line passing through the center P and a corner of the hexagonal hole 63 or on a line passing through the center P and the mid-point between of a pair adjacent corners of the hexagonal hole 63.

By inserting the bolt 48 in one of the bolt holes 62, the adjuster pin 20 can be secured at one of twelve different rotational positions, which are spaced apart by thirty degrees, relative to the actuator rod 13 or the tie-rod 16. In other words, the toe angles or the maximum steered angle of the rear wheels 2 can be finely adjusted by selecting one of twelve positions. Also, when rotating the adjuster pin 20, only the bolt 48 is removed and the bracket 61 does not have to be removed from the head 44 of the adjuster pin 20. That is, the adjuster pin 20 is rotated with the bracket 61 without removing the bracket 61 from the adjuster pin 20, which facilitates the adjustment.

The bracket 61 of FIG. 12 may be integrated with the adjuster pin 20. This prevents the bracket 61 from chattering against the adjuster pin 20 and allows the adjuster pin 20 to be accurately positioned.

Figure 13:
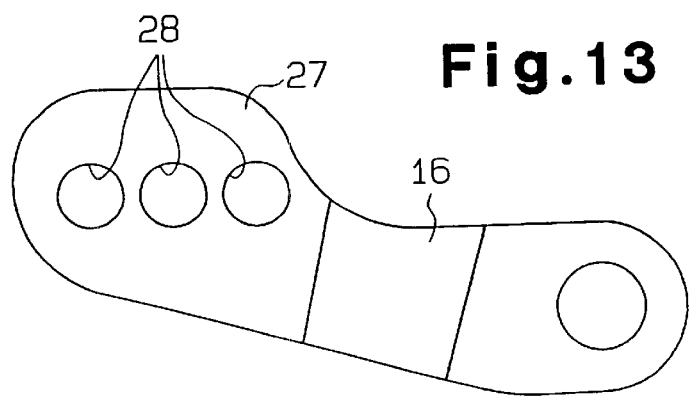
FIG. 13 is a plan view illustrating a tie-rod according to a fifth embodiment of the present invention.

FIG. 13 shows a tie-rod 16 according to a fifth embodiment. The tie-rod 16 is a modification of the tie-rod 16 of FIG. 3. As shown in FIG. 13, the tongue 27 of the tie-rod 16 has a plurality of through holes 28, the number of which is three in the FIG. 13, for receiving the adjuster pin 20. The holes 28 are arranged substantially in the longitudinal direction of the tie-rod 16. When the tie-rod 16 is coupled to the actuator rod 13, the toe angle can be changed in a wide range by selecting one of the holes 28 to receive the adjuster pin 20. Instead of the adjuster pin 20, a cylindrical pin having no eccentric portions may be used to couple the tie-rod 16 to the actuator rod 13. In this case, various toe angles can be selected, the number of which corresponds to the number of the through holes 28.

Figure 14:
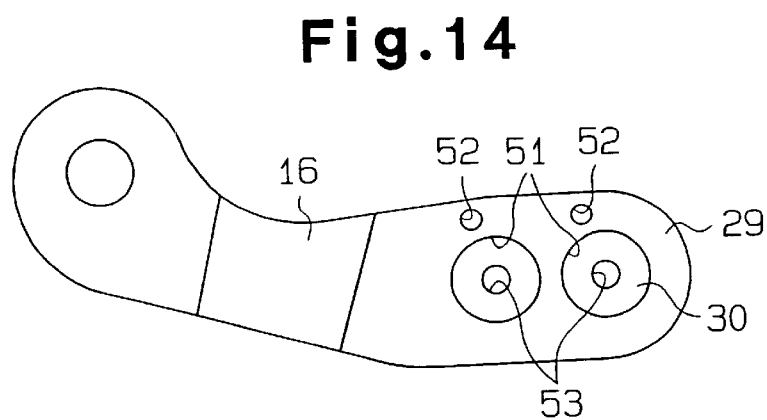
FIG. 14 is plan view illustrating a tie-rod according to a sixth embodiment of the present invention.

FIG. 14 shows a tie-rod 16 according to a sixth embodiment of the present invention. The tie-rod 16 of FIG. 14 is a modification of the tie-rod 16 of FIG. 7. As shown in FIG. 14, the upper clevis arm 29 of the tie-rod 16 has a plurality of through holes 51, the number of which is two in FIG. 14. The through holes 51 are arranged substantially along the longitudinal direction of the tie-rod 16 to receive the adjuster pin 20. The upper clevis arm 29 further includes threaded holes 52, each of which corresponds to one of the through holes 51. An adjuster pin 20 is inserted into one of the holes 51 and a bolt 48 is threaded into the corresponding threaded hole 52. The lower clevis arm 30 of the tie-rod 16 has through holes 53. The axis of each through hole 53 is aligned with the axis of the corresponding through hole 51 of the upper clevis arm 29.

When coupling the tie-rod 16 with the knuckle arm 15, the toe angle is selected from a wide range of positions by selecting a pair of through holes 51, 53 to receive the adjuster pin 20 as in the embodiment of FIG. 13. Instead of the adjuster pin 20, a cylindrical pin may be used for coupling the tie-rod 16 with the knuckle arm 15. In this case, various toe angles can be selected, the number of which corresponds to the number of the through holes 51.

Figure 15:
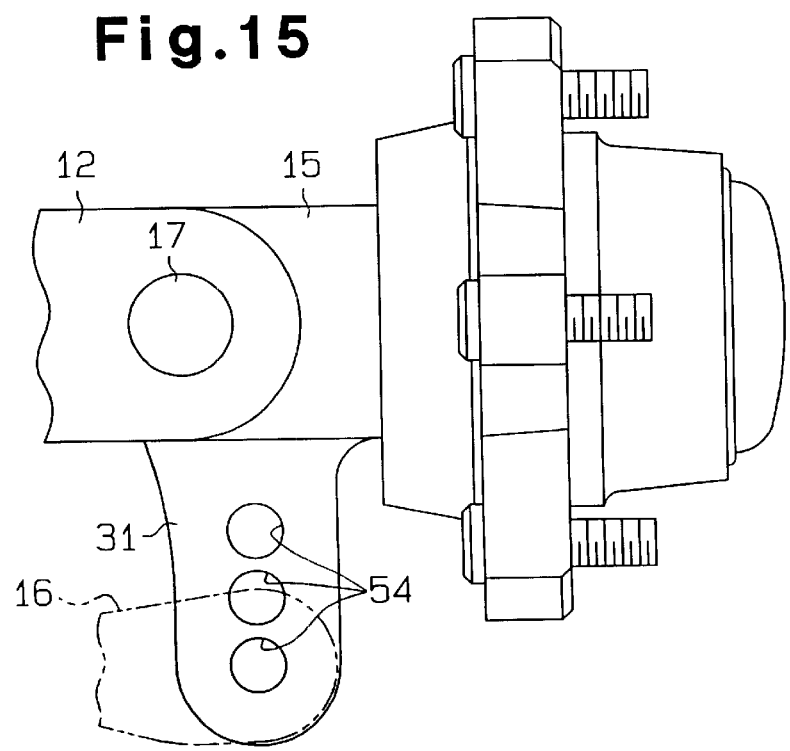
FIG. 15 is a plan view showing a knuckle arm according to a seventh embodiment of the present invention.
Figure 16:
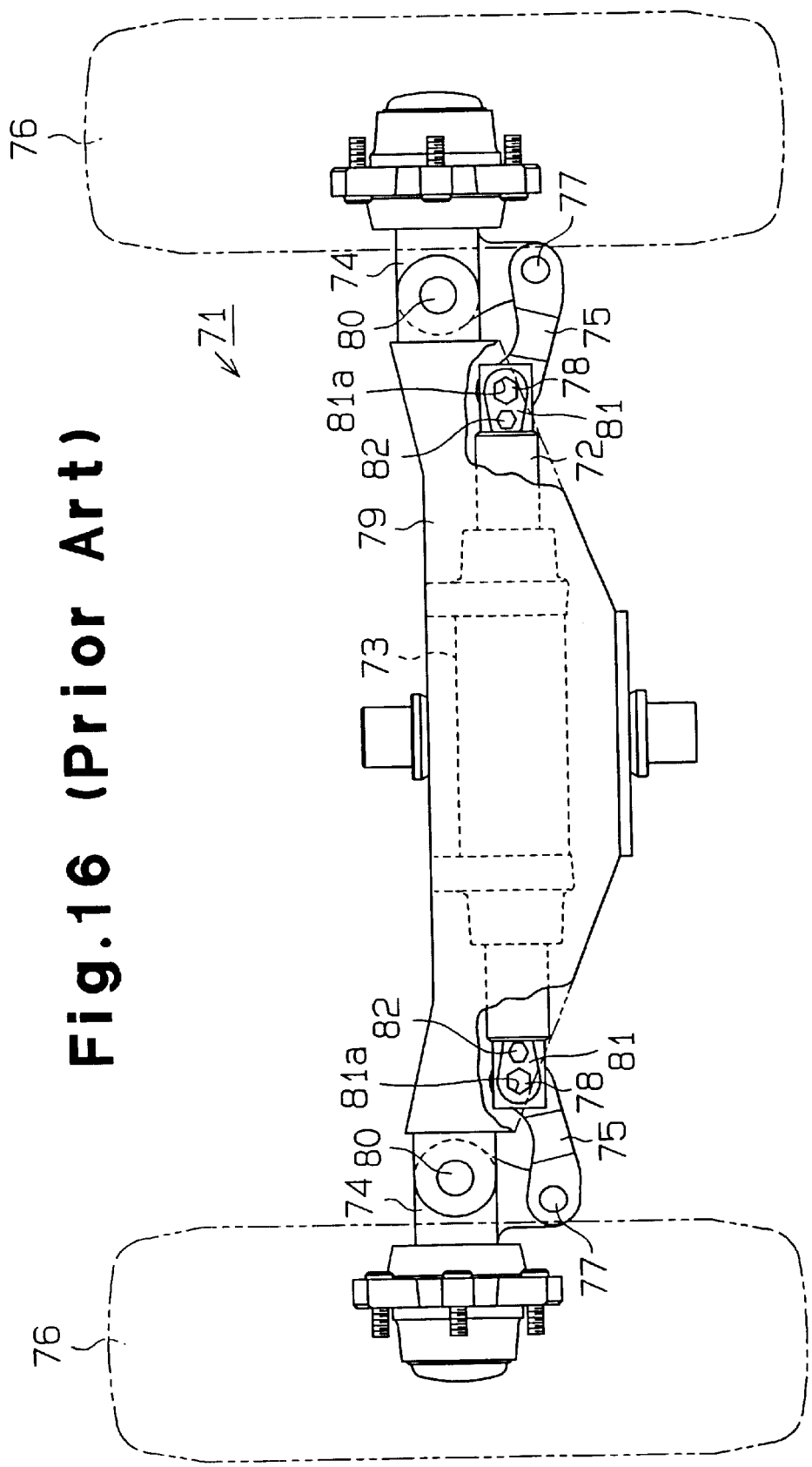
FIG. 16 is a plan view illustrating a prior art steering device.

FIG. 15 shows a knuckle arm 15 according to a seventh embodiment of the present invention. As shown in FIG. 15, the tongue 31 of the knuckle arm 15 has through holes 54, the number of which is three in FIG. 15. The adjuster pin 20 is inserted in one of the holes 54. The holes 54 are arranged in the longitudinal direction of the tongue 31. When coupling the tie-rod 16 with the knuckle arm 15, the maximum steered angle of the rear wheels 2 can be changed by selecting one of the through holes 54 to receive the adjuster pin 20. Instead of the adjuster pin 20, which has the eccentric shaft 43, a cylindrical pin may be used to couple the tie-rod with the knuckle arm 15. In this case, various maximum steered angles can be selected, the number of which corresponds to the number of the holes 54.

The illustrated embodiments may be modified as follows.

One of the bolt holes 46, 47 on the bracket 21 may be omitted. in this case, the toe angle or the maximum steered angle is selected among six positions.

Only one bolt hole may be formed in the bracket 21 and more than one threaded holes may be formed in the actuator rod 13 or in the tie-rod 16.

The angular interval between the bolt holes 46, 47 is not limited to thirty degrees. Preferably, the bolt holes 46, 47 are spaced apart by an angle other than the angle formed by lines passing through the center P of the polygonal hole 45 and two adjacent corners of the polygonal hole 45 (sixty degrees in FIG. 5) and multiples of that angle. If the polygonal hole 45 is a hexagon as shown in FIG. 5, the bolt holes 46, 47 are preferably spaced apart by an angle that, together with a small integer, is a factor of sixty (for example twenty degrees or fifteen degrees). In this case, the number of the bolt holes is equal to the small integer. For example, if the sixty degrees is divided into three equal parts (twenty degrees), the number of the bolt holes must be three. This structure allows the toe angles or the maximum steered angle to be more finely adjusted.

The shape of the head 44 of the adjuster pin 20 is not limited to a hexagon but may be another polygon or a gear. Of course, the shape of the hexagonal hole 45 must be changed in accordance with the shape of the head 44.

A corner of the head 44 of the adjuster pin 20 may be marked. The position of the marked corner tells the position of the eccentric shaft 43 of the adjuster pin 20.

The head 44 of the adjuster pin 20 may be omitted and the upper support shaft 41 may be shaped like a polygon. In this case, the through hole 24 of the upper clevis arm 22 of the actuator rod 13 or the through hole 51 of the upper clevis arm 29 of the tie-rod 16 is changed to a polygon to correspond to the shape of the support shaft 41. In this manner, the adjuster pin 20 is prevented from rotating without using the bracket 21. Therefore, the bracket 21 can be omitted, which reduces the number of parts in the device. In this case, the support shaft 41 at the upper portion of the adjuster pin 20 prevents the adjuster pin 20 from rotating.

The present invention is not limited to the steering device of forklifts but may be applied to a steering device of various types of industrial vehicles.

Therefore, the present examples and embodiments are to be considered as illustrative and not restrictive and the invention is not to be limited to the details given herein, but may be modified within the scope and equivalence of the appended claims.

What is claimed is:

1. A steering device for steering a pair of wheels about steering axes, wherein the wheels are located at left and right sides of a vehicle, respectively, the device comprising:

left and right knuckle arms for supporting the wheels, respectively, wherein the knuckle arms are supported by the vehicle such that each knuckle arm rotates about the steering axis of the corresponding wheel;

an actuator rod, wherein the actuator rod reciprocates in the lateral direction of the vehicle and has left and right ends, each end extending toward the corresponding knuckle arm;

left and right tie-rods, each tie-rod connecting the corresponding end of the actuator rod to the corresponding knuckle arm, wherein the tie-rods convert reciprocation of the actuator rod into rotation of the knuckle arms;

left and right actuator joints, each actuator joint being located between the corresponding end of the actuator rod and the corresponding tie-rod; and a toe angle adjusting mechanism located at only one of the left and right actuator joints to adjust the toe angle of the corresponding wheel, wherein a neutral position of the actuator rod is determined by moving the actuator rod until the toe angle of the wheel that does not correspond to the adjusting mechanism is set, wherein one of the actuator rod and the tie-rod that corresponds to the toe angle adjusting mechanism is a first member and the other is a second member, wherein the toe angle adjusting mechanism includes:

an adjuster pin, which pivotally couples the first member to the second member, wherein the adjuster pin has a support shaft and an eccentric shaft, the axis of the eccentric shaft being radially offset from the axis of the support shaft, wherein the first member pivots about the axis of the support shaft and the second member pivots about the axis of the eccentric shaft, and the adjuster pin is rotated to vary the positioning relationship between the first and second members to adjust the toe angle of the corresponding wheel; and a retainer for engaging the adjuster pin and for locking the adjuster pin with respect to the first member, wherein the retainer engages the adjuster pin at any one of a plurality of angular engagement positions, and wherein the retainer is fastened to the first member at any one of a plurality of angular fastening positions.

2. The steering device according to claim 1, wherein the vehicle includes an axle, the ends of which support the knuckle arms, respectively, wherein a cylinder, from which the actuator rod extends, is located in the axle, and wherein the ends of the actuator rod extend from the cylinder in opposite directions.

3. The steering device according to claim 1 wherein the adjuster pin has a polygonal engagement portion, and the retainer has a polygonal hole corresponding to the engagement portion, wherein the engagement portion engages the polygonal hole in any one of a plurality of different rotational positions.

4. The steering device according to claim 3, wherein a fastener secures the retainer to the first member in any one of a plurality of rotational positions.

5. The steering device according to claim 4, wherein the retainer has a plurality of through holes into which the fastener is inserted for securing the retainer to the first member, and wherein the through holes are angularly spaced apart by a predetermined angle about the axis of the polygonal hole.

6. The steering device according to claim 5, wherein the predetermined angle is different from an angle formed by radial lines passing through adjacent corners of the polygonal hole and multiples of that angle.

7. The steering device according to claim 5, wherein the through holes are located on a circle, the center of which is the center of the polygonal hole.

8. The steering device according to claim 1, further comprising maximum steered angle adjusting mechanisms located at steering joints, which are located between the tie-rods and the knuckle arms to adjust the maximum steered angle of the wheels, wherein the maximum steered angle adjusting mechanisms change the ratio of the rotation of the knuckle arms to the amount of movement of the actuator rod.

9. A steering device for steering a pair of wheels about steering axes, wherein the wheels are located at left and right sides of a vehicle's axle, respectively, the device comprising:

left and right knuckle arms for supporting the wheels, respectively, wherein the knuckle arms are supported by the ends of the axle, respectively, such that each knuckle arm rotates about the steering axis of the corresponding wheel;

an actuator rod, wherein the actuator rod reciprocates in the lateral direction of the vehicle and has left and right ends, each end extending toward the corresponding knuckle arm;

a cylinder, from which the actuator rod extends, located in the axle, wherein the ends of the actuator rod extend from the cylinder in opposite directions;

left and right tie-rods, each tie-rod connecting the corresponding end of the actuator rod to the corresponding knuckle arm, wherein the tie-rods convert reciprocation of the actuator rod into rotation of the knuckle arms;

left and right steering joints, each steering joint being located between the corresponding tie-rod and corresponding knuckle arm, wherein the steering joints are exposed and unobstructed by the axle; and a toe angle adjusting mechanism located at at least one of the steering joints to adjust the toe angle of the wheel, wherein one of the tie-rod and the knuckle arm that correspond to the toe angle adjusting mechanism is a first member and the other is a second member, wherein the toe angle adjusting mechanism includes:

an adjuster pin, which pivotally couples the first member to the second member, wherein the adjuster pin has a support shaft and an eccentric shaft, the axis of the eccentric shaft being radially offset from the axis of the support shaft, wherein the first member pivots about the axis of the support shaft and the second member pivots about the axis of the eccentric shaft, and the adjuster pin is rotated to vary the positioning relationship between the first and second members to adjust the toe angle of the corresponding wheel; and a retainer for engaging the adjuster pin and for locking the adjuster pin with respect to the first member, wherein the retainer engages the adjuster pin at any one of a plurality of angular engagement positions, and wherein the retainer is fastened to the first member at any one of a plurality of angular fastening positions.

10. The steering device according to claim 9, wherein the adjuster pin has a polygonal engagement portion, and the retainer has a polygonal hole corresponding to the engagement portion, wherein the engagement portion engages the polygonal hole in any one of a plurality of different rotational positions.

11. The steering device according to claim 10, wherein a fastener secures the retainer to the first member in any one of a plurality of rotational positions.

12. The steering device according to claim 11, wherein the retainer has a plurality of through holes into which the fastener is inserted for securing the retainer to the first member, and wherein the through holes are angularly spaced apart by a predetermined angle about the axis of the polygonal hole.

13. The steering device according to claim 12, wherein the predetermined angle is different from an angle formed by radial lines passing through adjacent corners of the polygonal hole and multiples of that angle.

14. The steering device according to claim 12, wherein the through holes are located on a circle, the center of which is the center of the polygonal hole.

15. A steering device for steering a pair of wheels about steering axes, wherein the wheels are located at left and right sides of a vehicle, the device comprising:

left and right knuckle arms for supporting the wheels, respectively, wherein the knuckle arms are supported by the vehicle such that each knuckle arm rotates about the steering axis of the corresponding wheel;

an actuator rod, wherein the actuator rod reciprocates in the lateral direction of the vehicle and has left and right ends, each end extending toward the corresponding knuckle arm;

left and right tie-rods, each tie-rod connecting the corresponding end of the actuator rod to the corresponding knuckle arm, wherein the tie-rods convert reciprocation of the actuator rod into rotation of the knuckle arms;

a variable pivot joint located in the steering device, wherein the variable pivot joint pivotally joins a first member and a second member, the first member being one of the tie-rods and the second member being the actuator rod or a corresponding one of the knuckle arms, the variable pivot joint comprising:

an adjuster pin having a support shaft and an eccentric shaft and an engagement portion, wherein the axis of the support shaft is parallel to and spaced from the axis of the eccentric shaft, and wherein one of the first and second members pivots about the axis of the support shaft and the other member pivots about the axis of the eccentric shaft, and the adjuster pin is rotated to vary the position of the first member with respect to the second member to adjust the characteristics of the steering device;

a retainer for engaging the engagement portion of the adjuster pin and for locking the adjuster pin with respect to one of the members of the variable pivot joint, wherein the retainer engages the adjuster pin at any one of a plurality of angular engagement positions, each angular engagement position being spaced from an adjacent angular engagement position by a first angle; and a fastener for fastening the retainer to one of the members of the variable pivot joint at one of at least two fastening positions, which are separated from one another by a second angle, wherein the second angle is different from the first angle.

16. A method of adjusting the toe angles of a pair of steered wheels of a vehicle comprising:

setting the toe angle of a first one of the wheels by axially moving an actuator rod, wherein axial movement of the actuator rod steers both wheels; and setting the toe angle of a second one of the wheels by adjusting a variable joint between a tie-rod, which is used for steering the second wheel, and either the actuator rod or a knuckle arm, the knuckle arm being pivoted by the tie-rod, wherein the variable joint has a movable axis, and wherein the toe angle of the second wheel is set by moving the movable axis without moving the actuator rod.

* * * * *

UNITED STATES PATENT AND TRADEMARK OFFICE
CERTIFICATE OF CORRECTION

PATENT NO.    : 6,402,168 B1                                          Page 1 of 1
DATED         : June 11, 2002
INVENTOR(S)   : Chino et al.

It is certified that error appears in the above-identified patent and that said Letters Patent is hereby corrected as shown below:

<u>Title page,</u>
Item [56], FOREIGN PATENT DOCUMENTS, "JP 304181" and insert therefor
-- TW 304181 --

Signed and Sealed this

Twenty-eighth Day of January, 2003

JAMES E. ROGAN
*Director of the United States Patent and Trademark Office*